US012796785B2

(12) United States Patent
Shitaka et al.

(10) Patent No.: US 12,796,785 B2
(45) Date of Patent: Nov. 17, 2026

(54) SLIDE FASTENER AND METHOD FOR MANUFACTURING STRINGER FOR SLIDE FASTENER

(71) Applicant: YKK Corporation, Tokyo (JP)

(72) Inventors: Jun Shitaka, Kurobe (JP); Takayuki Inukai, Kurobe (JP)

(73) Assignee: YKK Corporation, Tokyo (JP)

( * ) Notice: Subject to any disclaimer, the term of this patent is extended or adjusted under 35 U.S.C. 154(b) by 72 days.

(21) Appl. No.: 18/861,940

(22) PCT Filed: May 13, 2022

(86) PCT No.: PCT/JP2022/020184
§ 371 (c)(1),
(2) Date: Oct. 31, 2024

(87) PCT Pub. No.: WO2023/218631
PCT Pub. Date: Nov. 16, 2023

(65) Prior Publication Data
US 2025/0295205 A1 Sep. 25, 2025

(51) Int. Cl.
*A44B 19/02* (2006.01)
*A44B 19/30* (2006.01)
(Continued)

(52) U.S. Cl.
CPC .............. *A44B 19/02* (2013.01); *A44B 19/30* (2013.01); *A44B 19/38* (2013.01); *B29C 45/14573* (2013.01); *B29L 2005/00* (2013.01)

(58) Field of Classification Search
CPC ......... A44B 19/02; A44B 19/30; A44B 19/38; A44B 19/04; A44B 19/06; A44B 19/08;
(Continued)

(56) References Cited

U.S. PATENT DOCUMENTS

| | | | | |
|---|---|---|---|---|
| 2,502,055 A * | 3/1950 | Morin | A44B 19/308 24/421 |
| 2,546,088 A * | 3/1951 | Corner | A44B 19/06 24/424 |

(Continued)

FOREIGN PATENT DOCUMENTS

| | | |
|---|---|---|
| JP | 2016-202761 A | 12/2016 |
| WO | 2013/051149 A1 | 4/2013 |
| WO | 2015/122018 A1 | 8/2015 |

OTHER PUBLICATIONS

International Preliminary Report on Patentability, PCT Patent Application No. PCT/JP2022/020184, Nov. 7, 2024, 7 pages.

(Continued)

*Primary Examiner* — Jack W Lavinder
(74) *Attorney, Agent, or Firm* — Kilpatrick Townsend & Stockton LLP

(57) ABSTRACT

A slide fastener includes: a pair of stringers; and a slider. The pair of stringers include: a pair of tapes, a pair of element rows each including a plurality of elements, and an opener. At least one element row includes the elements of a plurality of types, and is classified into a neighboring class, and a remote class. Regarding an impact to be applied to the elements and the stop claw which collide inside the slider when a force for pulling out one of the element rows from the slider is applied to the one element row, the elements forming the remote class include strong elements of a type configured to strengthen the impact more than the elements forming the neighboring class. All of the elements forming the neighboring class are weak elements of a type configured to weaken the impact more than the strong elements.

12 Claims, 9 Drawing Sheets

(51) Int. Cl.
*A44B 19/38* (2006.01)
*B29C 45/14* (2006.01)
*B29L 5/00* (2006.01)

(58) Field of Classification Search
CPC ... A44B 19/303; A44B 19/305; A44B 19/306; A44B 19/308; B29C 45/14573; Y10T 24/2577
See application file for complete search history.

(56) References Cited

U.S. PATENT DOCUMENTS

| | | | | |
|---|---|---|---|---|
| 4,719,673 | A * | 1/1988 | Kubo | A44B 19/306<br>24/421 |
| 2014/0013548 | A1 | 1/2014 | Takani et al. | |
| 2015/0033512 | A1 | 2/2015 | Kojima et al. | |
| 2016/0338453 | A1* | 11/2016 | Kojima | A44B 19/06 |

OTHER PUBLICATIONS

International Search Report, PCT Patent Application No. PCT/JP2022/020184, Jul. 12, 2022, 5 pages.
Written Opinion, PCT Patent Application No. PCT/JP2022/020184, Jul. 12, 2022, 3 pages.

* cited by examiner

SLIDE FASTENER AND METHOD FOR MANUFACTURING STRINGER FOR SLIDE FASTENER

TECHNICAL FIELD

The present invention relates to a slide fastener including a pair of stringers and a slider capable of opening and closing the pair of stringers and stopping at a position with respect to the pair of stringers, and a method for manufacturing the stringer.

BACKGROUND ART

Patent Literature 1 discloses a slide fastener including a pair of tapes extending in a front-rear direction and facing each other in a left-right direction; a pair of element rows each including a plurality of elements fixed along a corresponding one of facing side edge portions of the pair of tapes; and a slider for meshing and separating the pair of element rows. Further, the slider includes a stop claw that comes into contact with the elements in order to stop at a position with respect to the pair of element rows.

Patent Literature 2 discloses a slide fastener including a pair of tapes, a pair of element rows, a slider, and an opener referred to as a separating insert. A combination of the element row, the opener, and the tape is referred to as a stringer. Opening (separating) the pair of element rows by moving the slider toward the opener is referred to as pulling down the slider, and closing (meshing) the pair of element rows by moving the slider toward a side opposite to the opener is referred to as pulling up the slider.

Further, the separating insert as the opener disclosed in Patent Literature 2 includes a left opener piece referred to as a separable pin and a right opener piece in which a retainer pin and a retaining box are integrated.

CITATION LIST

Patent Literature

Patent Literature 1: JP2016-202761A
Patent Literature 2: WO2013/051149A1

SUMMARY OF INVENTION

Technical Problem

After the slide fastener gets to, from a state where the pair of element rows are meshed, a situation in which the slider is pulled down completely, in other words, a situation in which the slider comes into contact with the opener, when a force (hereinafter, may be referred to as "pulling out force") for pulling out one of the element rows from the slider is applied to the one element row, one of the opener pieces comes off from the slider together with the one element row, and the pair of element rows are completely separated.

Meanwhile, when the slide fastener gets to, from the state where the pair of element rows are meshed, a situation in which the slider is pulled down halfway, in other words, a situation in which the slider and the opener are separated, the slider is stopped at a position with respect to the pair of element rows by the stop claw coming into contact with the elements.

However, the pulling out force may be applied in the situation in which the slider and the opener are separated. A typical example of the pulling out force being applied will be described with reference to a case where the slide fastener is attached to a coat. The typical example of the pulling out force being applied is that a wearer of the coat attempts to take off the coat while thinking that the slider has been pulled down completely in spite of a situation in which the slider and the opener are separated in fact, and operates the pair of element rows that extend from the slider in a bifurcated manner to widen a space between the pair of element rows.

In the slide fasteners disclosed in Patent Literatures 1 and 2, all the elements forming the pair of element rows are of one type, and all the elements have the same shape. In the situation in which the slider is pulled down halfway and the slider and the opener are separated, the stop claw comes into contact with any of the elements in the same state regardless of the position of the slider.

Then, in the slide fasteners disclosed in Patent Literatures 1 and 2, when the pulling out force is applied as in the typical example described above, a force moving the slider toward the opener is applied to the slider, and the elements and the stop claw collide with each other inside the slider. When the pulling out force is large, an impact between the elements and the stop claw is strong (is large) inside the slider, the stop claw rides over the elements, and the elements or the stop claw may be damaged, or not only the element or the stop claw may be damaged but also the elements may come off from the tape.

In addition, the situation in which the pulling out force may be applied is not limited to the typical example, and is assumed to be a situation in which the pair of element rows are meshed halfway, in other words, a situation in which the slider is pulled down to some extent with respect to the pair of element rows in a completely meshed state. In the situation in which the pulling out force may be applied, it is desirable to weaken (reduce) the impact between the elements and the stop claw that collide inside the slider as much as possible. The impact may be hereinafter referred to as "slider lock strength". This is because the slider is stopped (locked) by the stop claw at a position with respect to the pair of element rows.

Meanwhile, in a situation in which the pair of element rows are completely meshed, it can be said that there is normally no possibility to apply the pulling out force, and in the situation, it is desirable that the slider lock strength is stronger (larger) than in the situation in which the pulling out force may be applied.

The present invention has been made in view of the above circumstances, and an object of the present invention is to weaken (reduce) a slider lock strength as much as possible when a pulling out force is applied in a situation in which a slider is pulled down halfway in a state where a pair of element rows are meshed (a situation in which the slider and an opener are separated). Further, another object of the present invention is to make the element and the like as unlikely to be damaged as possible by reducing the slider lock strength.

Solution to Problem

A slide fastener of the present invention includes a pair of stringers; and a slider configured to open and close the pair of stringers and configured to stop at a position with respect to the pair of stringers. The pair of stringers include a pair of tapes extending in a front-rear direction and facing each other in a left-right direction; a pair of element rows each including a plurality of elements fixed along a corresponding one of the facing side edge portions of the pair of tapes; and an opener including a pair of opener pieces separately fixed to one end portions of the pair of tapes in the front-rear direction, the opener allowing one of the opener pieces to be inserted into and removed from the slider together with one of the element rows. The slider includes a slider body that is configured to mesh and separate the pair of element rows and a stop claw that is configured to stop at a position with respect to the pair of element rows, and a claw tip that is one end portion of the stop claw is configured to be lowered inside the slider body and configured to come into contact with the elements. At least one element row among the element rows with which the claw tip is to come into contact includes the elements of a plurality of types. Further, the element row is classified into a neighboring class which is a set of the elements in a neighborhood of the opener and up to an n-th element from the opener, and a remote class which is a set of the elements from an (n+1)-th element onwards from the opener. n is an integer of 1 or more. Regarding an impact to be applied to the elements and the stop claw which collide inside the slider when a force for pulling out one of the element rows from the slider is applied to the one element row, the elements forming the remote class include strong elements of a type configured to strengthen the impact more than the elements forming the neighboring class. All of the elements forming the neighboring class are weak elements of a type configured to weaken the impact more than the strong elements.

The elements forming the remote class may include only the strong elements or may include the strong elements and the weak elements. For this reason, the elements forming the remote class are set to include the strong elements. Meanwhile, all of the elements forming the neighboring class are the weak elements. Accordingly, for example, in a case where all of the elements forming the element row are configured such that the elements up to an n-th element from the opener are the weak elements, an (n+1)-th element is the strong element, several elements from an (n+2)-th element onwards are the weak elements, and the subsequent elements are the strong elements, a set of the elements up to the n-th element from the opener is the neighboring class, and a set of the elements from the (n+1)-th element onwards is the remote class.

The "at least one element row among the element rows with which the claw tip is to come into contact" includes (1) a case where the element rows with which the claw tip comes into contact are the pair of element rows and all of (the pair of) the element rows, (2) a case where the element rows with which the claw tip comes into contact are the pair of element rows, and are only one of the pair of element rows, and (3) a case where the element rows with which the claw tip comes into contact are only one of the pair of element rows and are the one element row.

In the cases of the above (2) and (3), as long as one of the element rows is classified into the neighboring class and the remote class, it does not matter whether another one of the element rows is classified into the neighboring class and the remote class. Therefore, in the cases of the above (2) and (3), the other one of the element rows may include elements of a plurality of types, or may include elements all of which are of the same type, or more specifically, may include, for example, only strong elements.

Regarding the n-th element from the opener, n matches the number of weak elements in the neighboring class. Further, in the case of the above (1), it does not matter whether n (the number of weak elements in the neighboring class) regarding one of the element rows is the same as n (the number of weak elements in the neighboring class) regarding the other one of the element rows.

It is desirable that n is set as follows.

That is, n is equal to or less than an integer that is half a total number of the elements forming each of the element rows, or equal to or less than an integer closest to the half.

It is desirable that n is set as follows.

That is, n is 10 or less.

Specific examples of each of the weak elements and each of the strong elements are as follows.

That is, in the front-rear direction, a direction in which the slider is moved away from the opener is defined as a forward direction, and a trajectory in which the claw tip of the stop claw passes above the pair of element rows is defined as a claw trajectory. In addition, regarding a corner portion between an upper surface and a front surface of each of the elements, which is directly below the claw trajectory, a surface of the corner portion of each of the weak elements is a lower corner surface that is lower than a surface of the corner portion of each of the strong elements.

It is desirable that a width of the lower corner surface in the left-right direction is equal to or larger than a length of a portion at which the claw tip comes into contact with the weak element, that is, equal to or larger than a width of the claw tip in the left-right direction.

It is desirable that a specific example of the lower corner surface is as follows.

That is, the lower corner surface is lowered as going toward the forward direction.

A more specific example of the lower corner surface is as follows.

That is, the lower corner surface is lowered as going toward the forward direction, and is a curved surface that is curved in a state of bulging in an arc shape.

Specific examples of the weak element and the strong element are as follows.

That is, in the front-rear direction, a direction in which the slider is moved away from the opener is defined as a forward direction, and a trajectory in which the claw tip of the stop claw passes above the pair of element rows is defined as a claw trajectory. In addition, each of the weak elements is, at a front portion of an upper surface of each of the elements, which is directly below the claw trajectory, a forward inclined surface that is lowered as going toward the forward direction.

It is desirable that a width of the forward inclined surface in the left-right direction is equal to or larger than the length of the portion at which the claw tip comes into contact with the weak element, that is, equal to or larger than the width of the claw tip in the left-right direction.

Other specific examples of the weak element and the strong element are as follows.

That is, in the front-rear direction, a direction in which the slider is moved away from the opener is defined as a forward direction, and a trajectory in which the claw tip of the stop claw passes above the pair of element rows is defined as a claw trajectory. In addition, in an entire region that is directly below the claw trajectory on an upper surface of each of the elements, an upper surface of each of the weak elements is lower than an upper surface of each of the strong elements.

A more specific example of the upper surface of the weak element is as follows.

That is, in addition to being lower than the upper surface of the strong element in the entire region that is directly below the claw trajectory on the upper surface of each of the elements, the upper surface of the weak element is, in an entire region from directly below the claw trajectory to a direction opposite to a corresponding one of the tapes, a tip-facing inclined surface that is lowered as going toward a side opposite to the tape.

A method for manufacturing a stringer of the present invention is used for the above-described slide fastener, and includes a first injection molding step of injection-molding the strong elements on each of the tapes; a strong element removing step of removing the strong elements from a part of the tape to form a removed portion on the tape; and a second injection molding step of injection-molding the opener pieces and the weak elements on the tape in a region including the removed portion.

As an example of the second injection molding step, the following two methods are exemplified.

That is, in an example of the second injection molding step, the opener pieces are injection-molded after the weak elements are injection-molded.

In another example of the second injection molding step, the weak elements and the opener pieces are injection-molded at the same time.

Advantageous Effects of Invention

In the slide fastener of the present invention, regarding an impact (slider lock strength) to be applied to the elements and the stop claw that collide inside the slider when a force for pulling out one of the element rows from the slider is applied to the one element row, since all of the elements forming the neighboring class are the weak elements of a type that weaken the impact (slider lock strength) more than the strong elements, the impact to be applied to the weak elements and the stop claw in a situation in which the slider is arranged in the neighboring class is weaker than the impact to be applied to the strong elements and the stop claw in a situation in which the slider is arranged in the remote class. As a result, the elements or the like are less likely to be damaged or the like.

Figure 3:
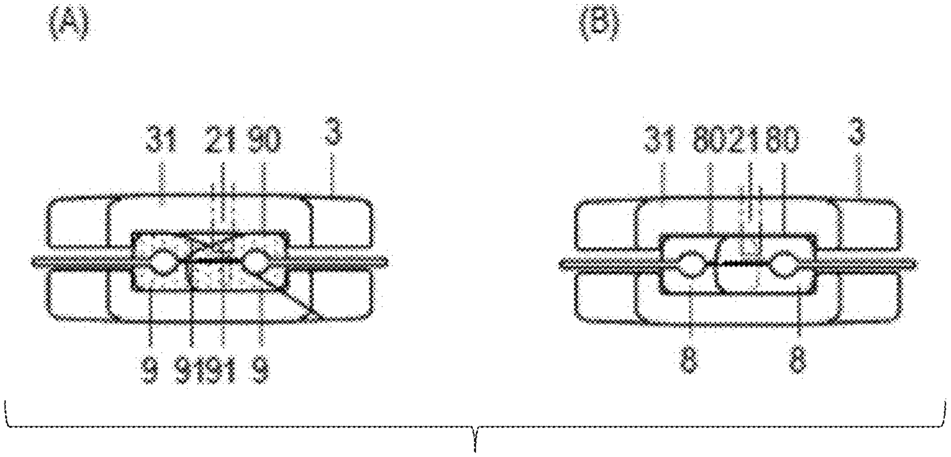

(A) and (B) of FIG. 3 are front views showing the relationship between the claw tip and the elements in the slide fastener of the first embodiment, (A) of FIG. 3 shows a relationship between the claw tip and weak elements, and (B) of FIG. 3 shows a relationship between the claw tip and strong elements.

Figure 4:
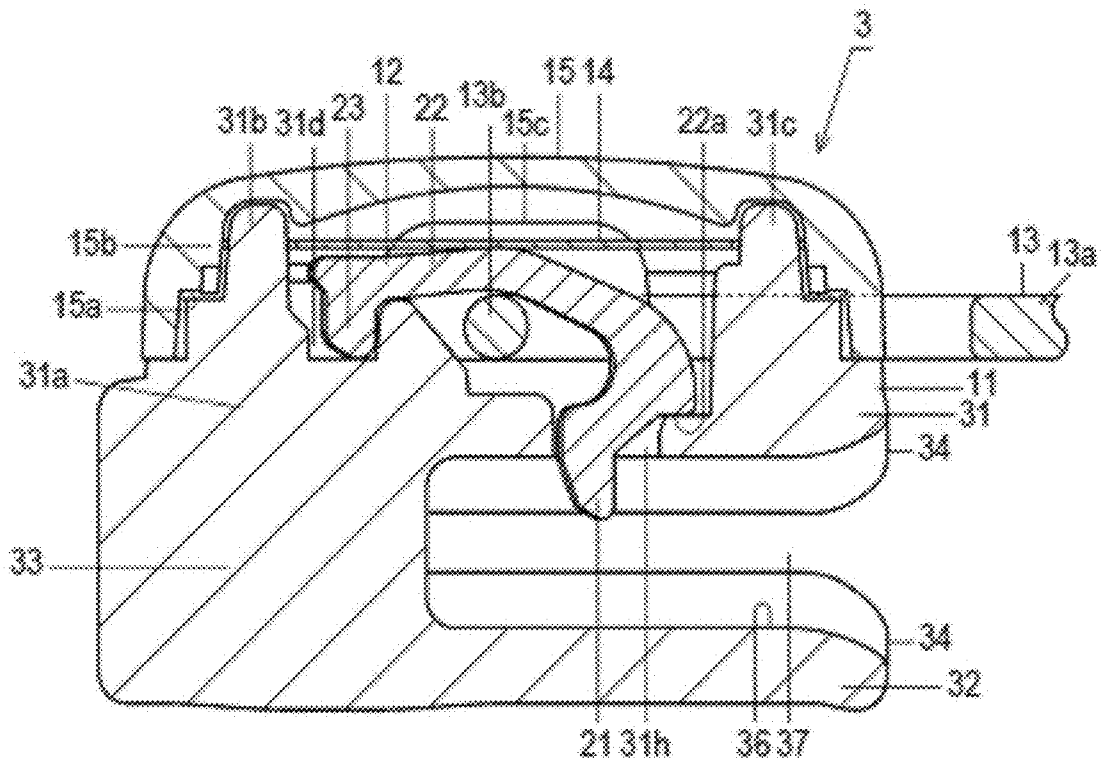

FIG. 4 is a cross-sectional view of the slider of the slide fastener of the first embodiment taken along an upper-lower direction.

Figure 5:
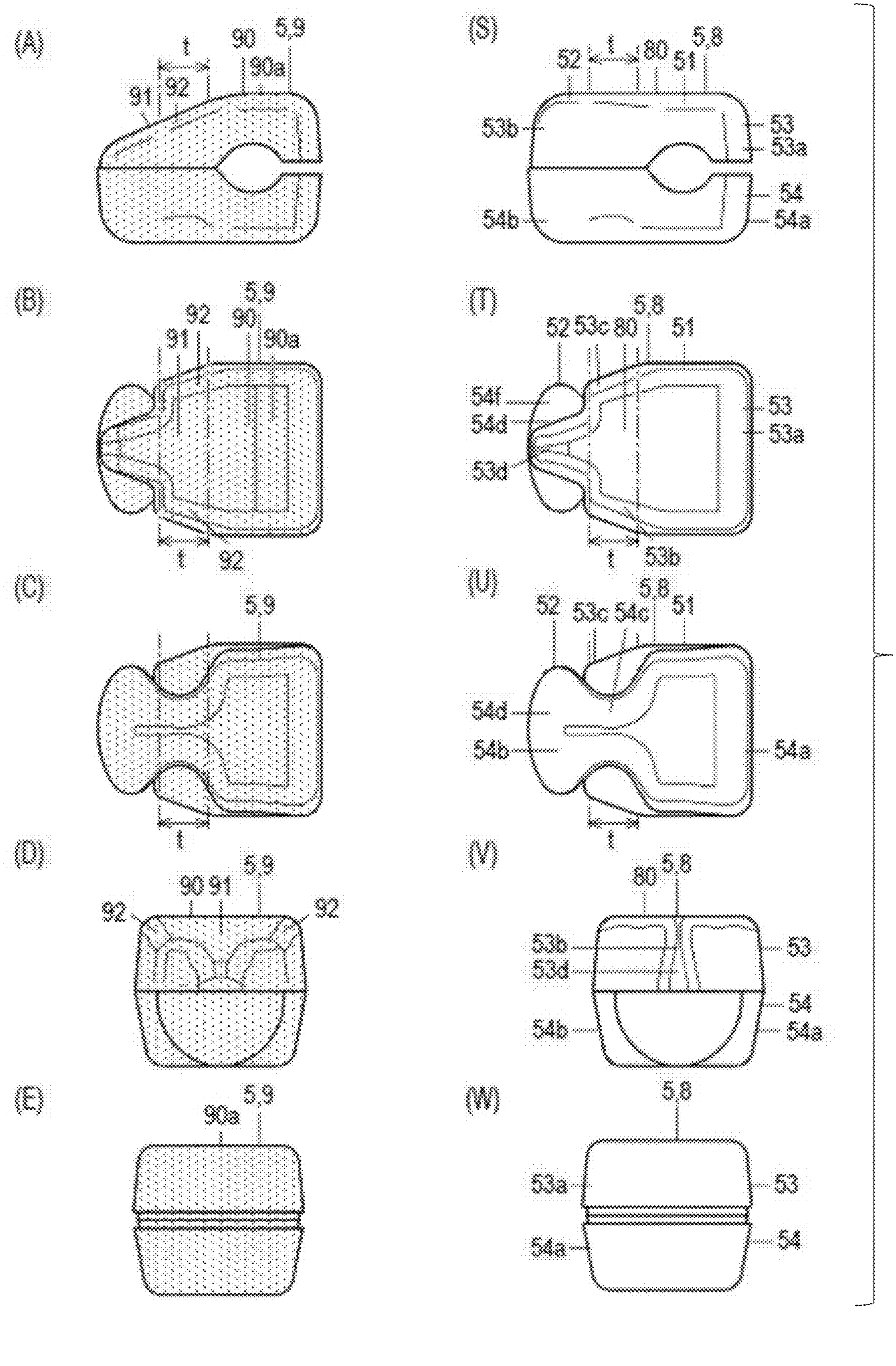

(A) to (E) of FIG. 5 are respectively a front view, a plan view, a bottom view, a left side view, and a right side view of the weak element of the first embodiment, and (S) to (W) of FIG. 5 are respectively a front view, a plan view, a bottom view, a left side view, and a right side view of the strong element of the first embodiment.

Figure 6:
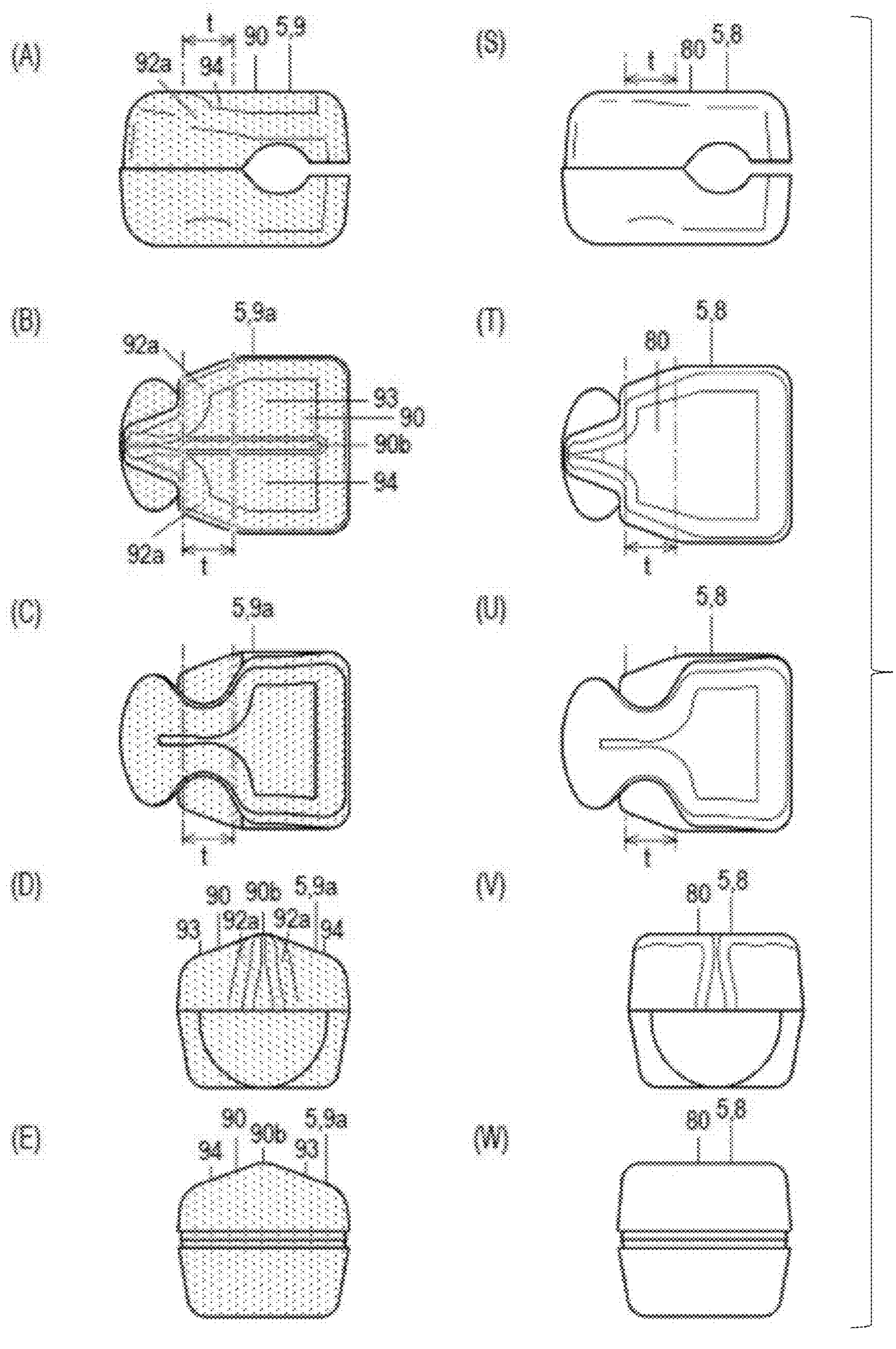

(A) to (E) of FIG. 6 are respectively a front view, a plan view, a bottom view, a left side view, and a right side view of a weak element of a second embodiment, and (S) to (W) of FIG. 6 are respectively a front view, a plan view, a bottom view, a left side view, and a right side view of a strong element of the second embodiment.

Figure 7:
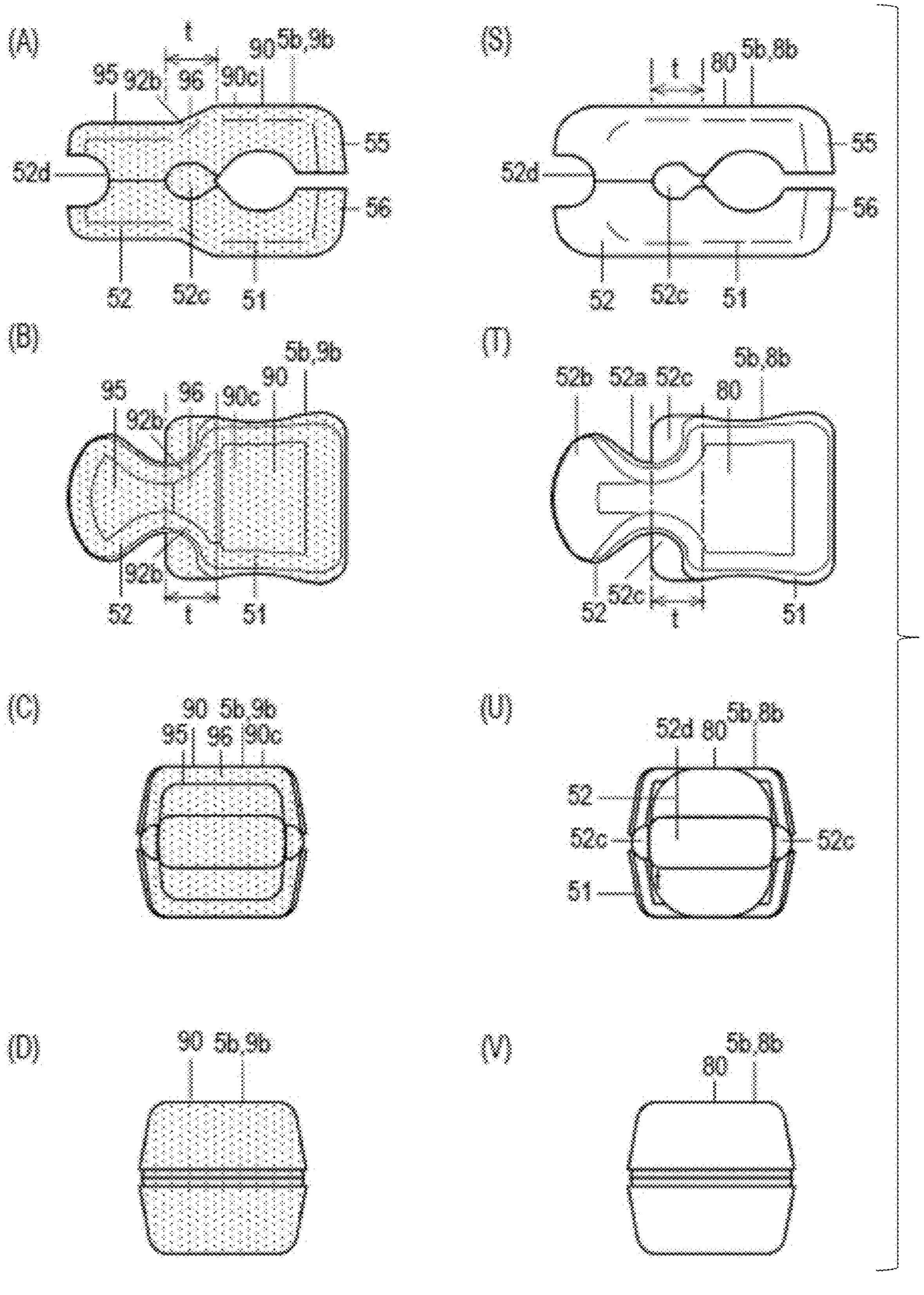

(A) to (D) of FIG. 7 are respectively a front view, a plan view, a left side view, and a right side view of a weak element of a third embodiment, and (S) to (V) of FIG. 7 are respectively a front view, a plan view, a left side view, and a right side view of a strong element of the third embodiment.

Figure 8:
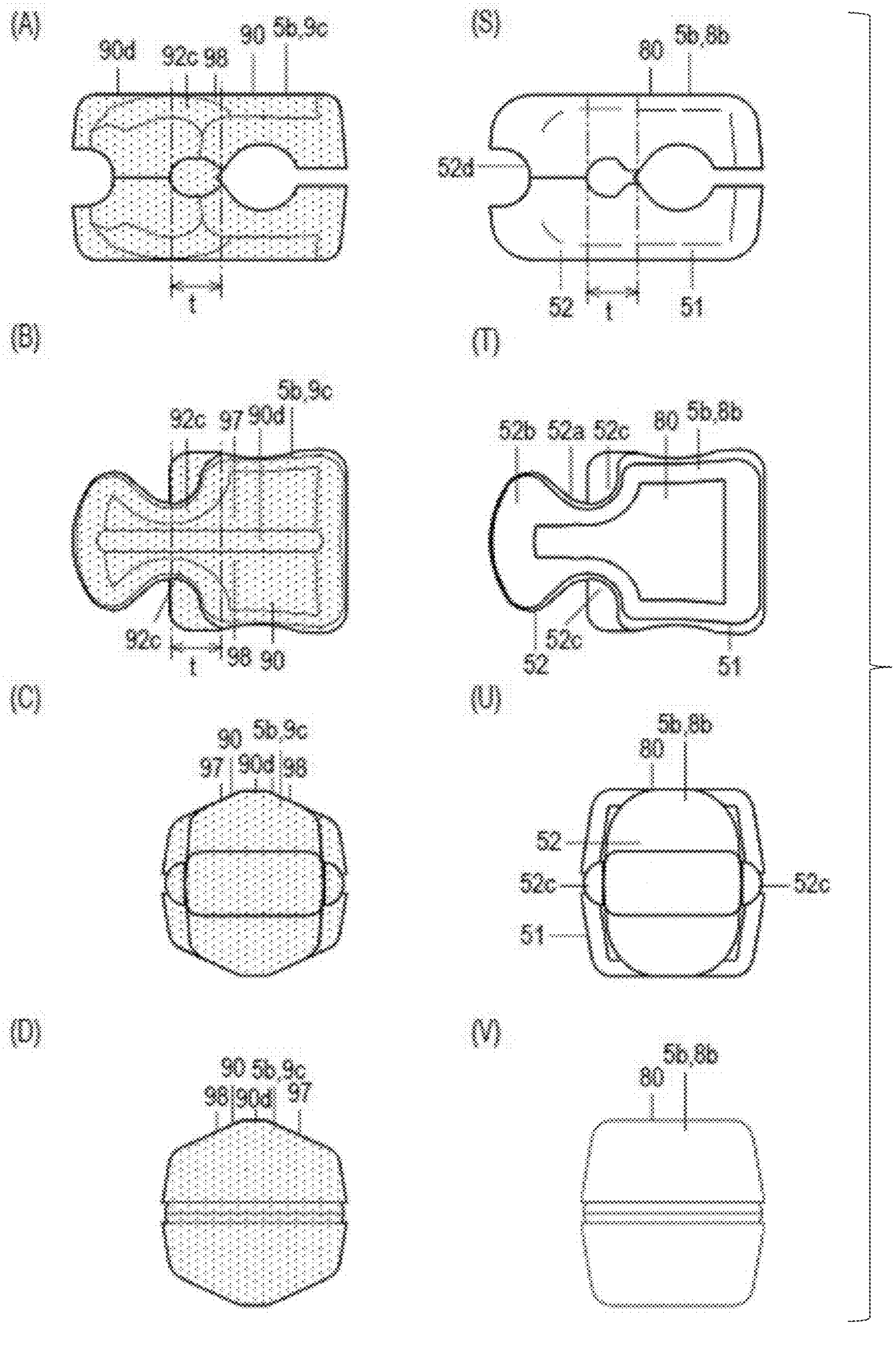

(A) to (D) of FIG. 8 are respectively a front view, a plan view, a bottom view, a left side view, and a right side view of a weak element of a fourth embodiment, and (S) to (V) of FIG. 8 are respectively a front view, a plan view, a left side view, and a right side view of a strong element of the fourth embodiment.

Figure 9:
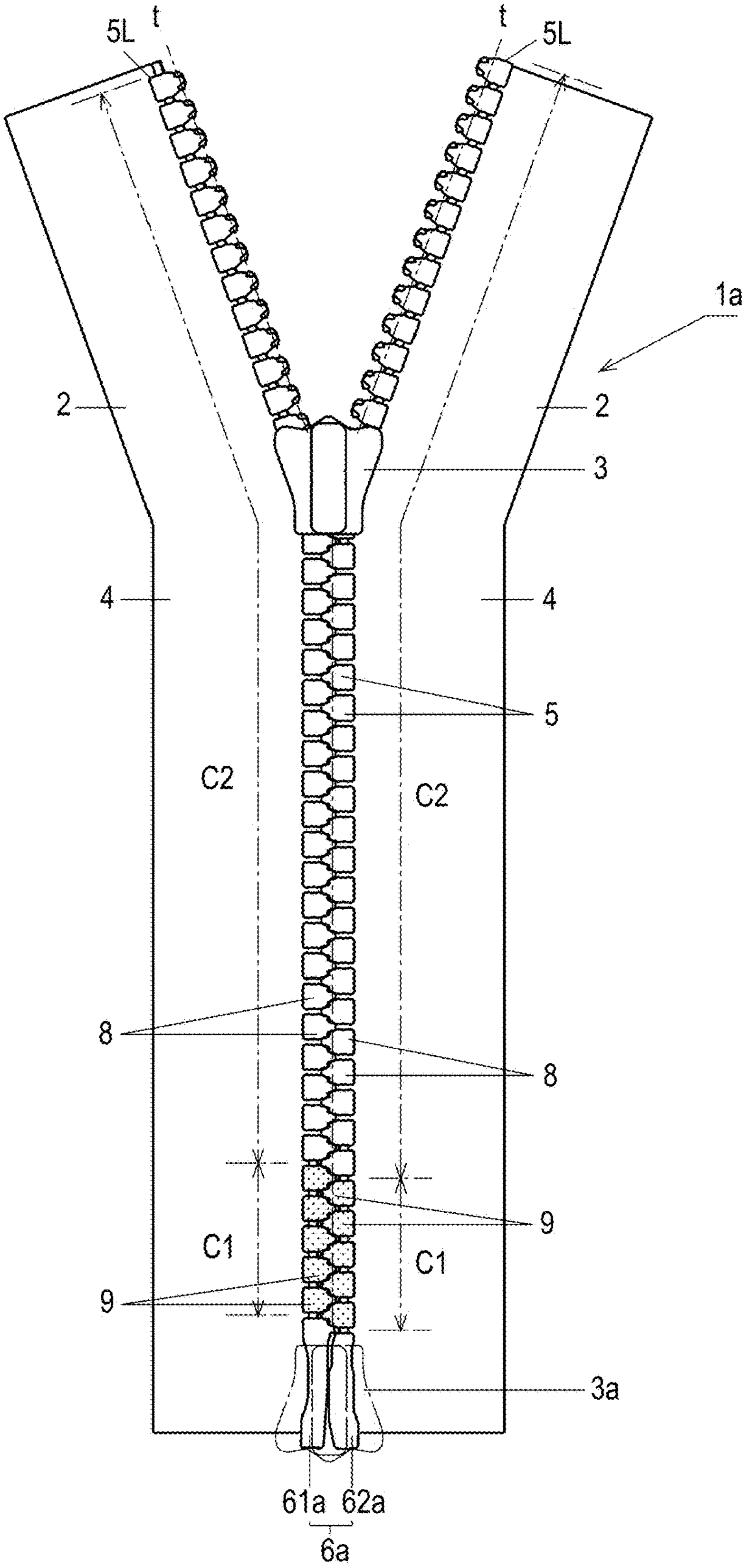

FIG. 9 is a plan view showing an entire slide fastener of a fifth embodiment of the present invention.

Figure 10:
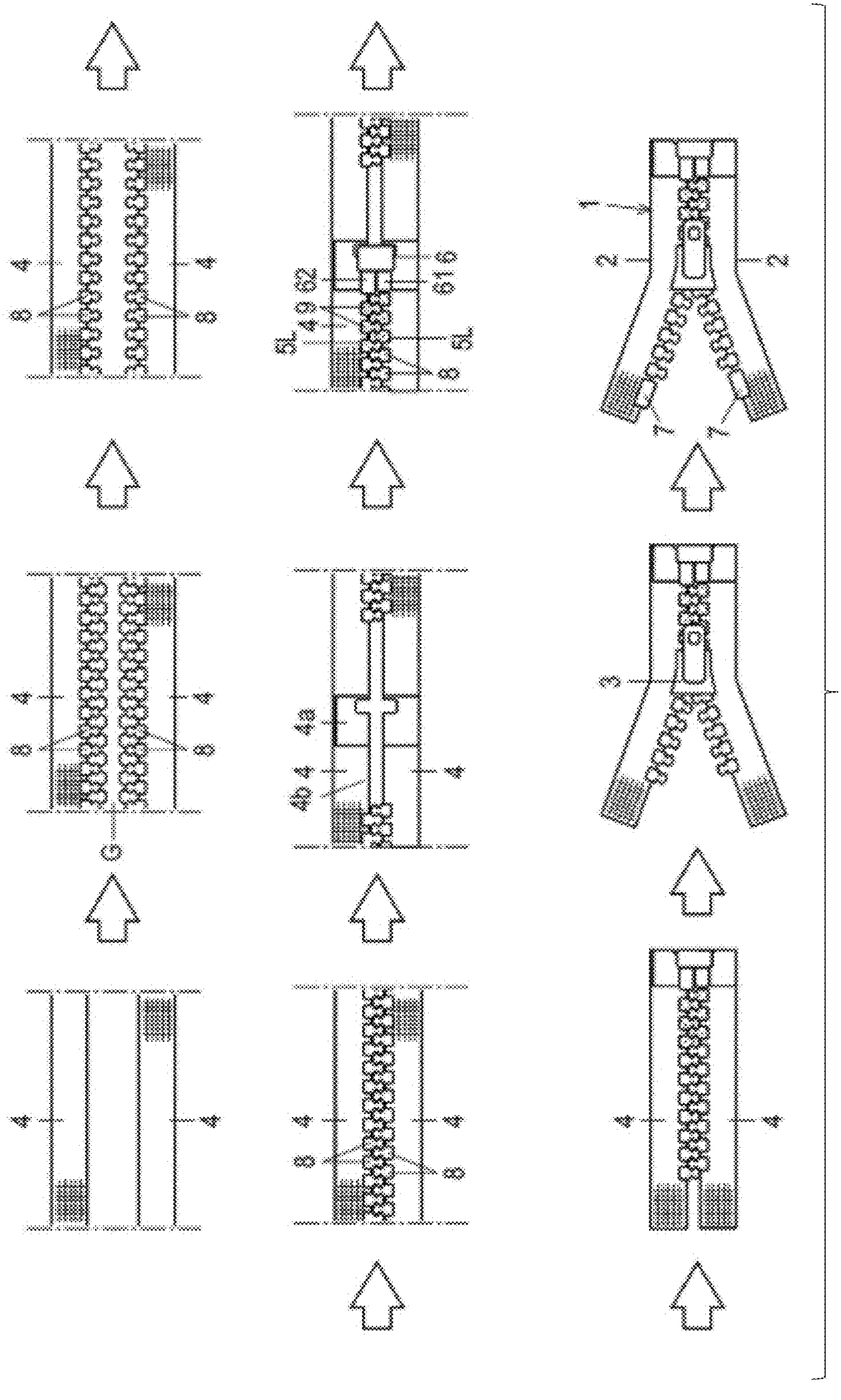

FIG. 10 is a view illustrating a method of manufacturing the slide fastener according to the first embodiment of the present invention in order of steps.

DESCRIPTION OF EMBODIMENTS

Figure 1:
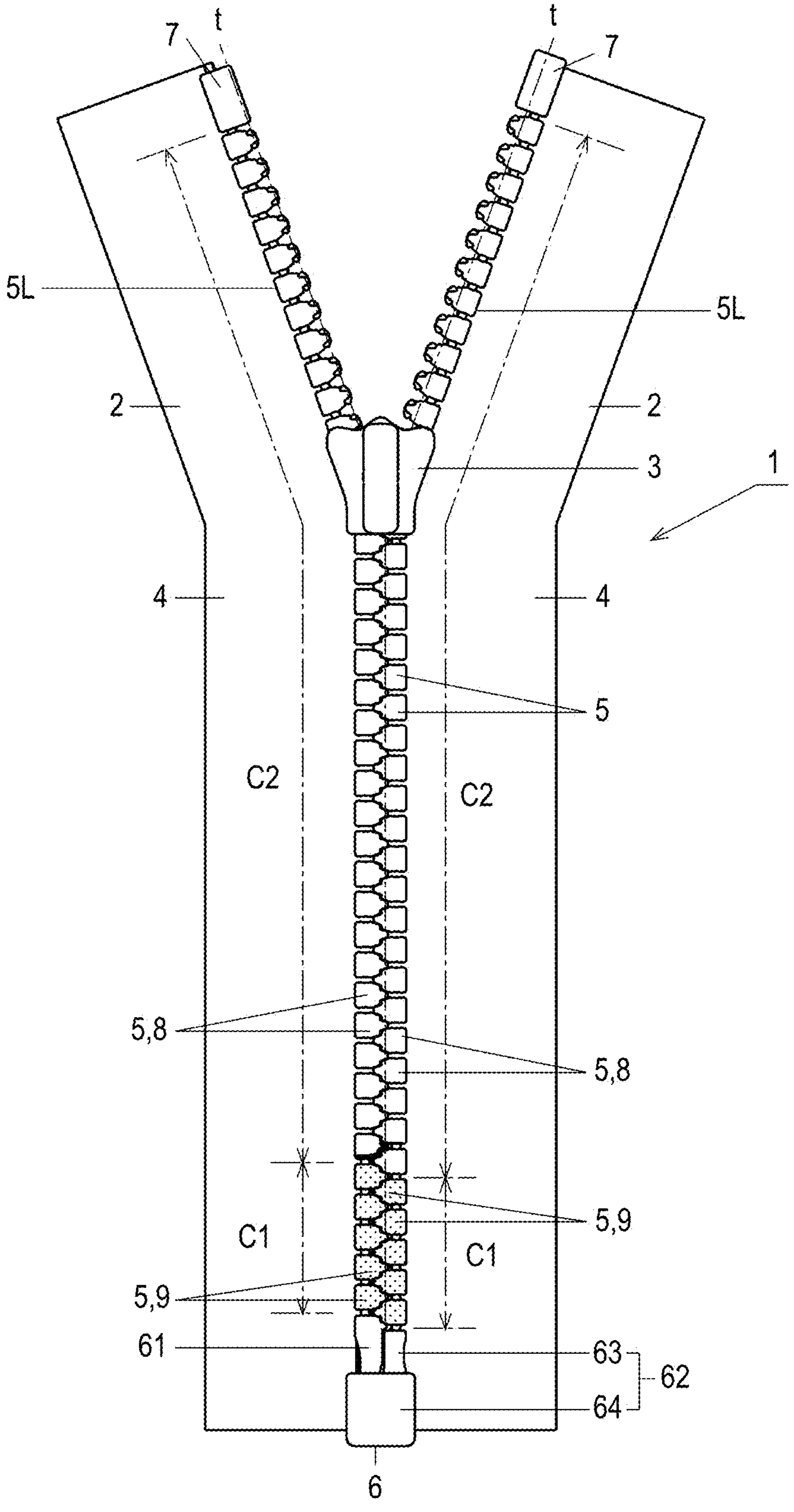
FIG. 1 is a plan view showing an entire slide fastener of a first embodiment of the present invention.

As shown in FIG. 1, a slide fastener 1 according to a first embodiment of the present invention includes a pair of stringers 2 that extend in a front-rear direction and that face each other in a left-right direction, and a slider 3 that is movable in the front-rear direction at facing side edge portions of the pair of stringers 2 and that opens and closes the pair of stringers 2. The "facing side edge portion" is a right edge portion in the case of the left stringer 2, and is a left edge portion in the case of the right stringer 2.

In the slide fastener 1, the pair of stringers 2 can be opened and closed by moving the slider 3 in the front-rear direction. A direction is determined as follows in a state where the slide fastener 1 is placed on a plane.

A "forward direction" is a direction in which the pair of stringers 2 are closed, and is an upward direction in FIG. 1.

A "rearward direction" is a direction in which the pair of stringers 2 are opened, and is a downward direction in FIG. 1. The left-right direction is a direction in which the pair of stringers 2 are arranged, and is orthogonal to the front-rear direction in FIG. 1.

A "leftward direction" is a leftward direction in FIG. 1. A "rightward direction" is a right direction in FIG. 1.

The "upper-lower direction" is a direction orthogonal to the front-rear direction and the left-right direction, and is also referred to as a thickness direction. The "upward direction" is a direction facing a front side in a direction orthogonal to a paper surface (a direction orthogonal to the front-rear direction and the left-right direction) in FIG. 1.

The "downward direction" is a direction toward a back side in the direction orthogonal to the paper surface in FIG. 1.

The pair of stringers 2 include a pair of tapes 4 extending in the front-rear direction and facing each other in the left-right direction, a pair of element rows 5L each including a plurality of elements 5 fixed along a corresponding one of the facing side edge portions of the pair of tapes 4, an opener 6 fixed to rear end portions of the pair of tapes 4 in the front-rear direction, and a pair of stoppers 7 separately fixed to front end portions of the pair of tapes 4 on a side opposite to the opener 6. In the front-rear direction, a direction in which the slider 3 is moved away from the opener 6 is the forward direction.

Each of the tapes 4 has a band shape elongated in the front-rear direction, and a thickness direction thereof is the upper-lower direction.

The stoppers 7 and the opener 6 determine a movement range of the slider 3 in the front-rear direction with respect to the pair of element rows 5L by collision with the slider 3 during movement. The stoppers 7 are fixed to the front end portions of the tapes 4 in the front-rear direction so as to be adjacent to the element rows 5L on a front side thereof.

The opener 6 includes a pair of opener pieces 61, 62 that are separately fixed to the rear end portions of the pair of tapes 4 in the front-rear direction so as to be adjacent to the element rows 5L on a rear side thereof. In the present embodiment, one opener piece 61 is an separable pin 61 fixed to the facing side edge portion of one of the tapes 4, and another opener piece 62 is a retainer box 62 fixed to the facing side edge portion of another of the tapes 4.

The separable pin 61 is fixed to the tape 4 and covers three surfaces including an upper surface and a lower surface of the tape 4, and a side surface on a tape 4 side facing the separable pin 61. The separable pin 61 can be inserted into and removed from the slider 3 and the retainer box 62 together with one of the element rows 5L in a state where the slider 3 is pulled down to come into contact with the retainer box 62, that is, in a state where the slider 3 and the retainer box 62 are brought into contact with each other (in a state where the slider 3 and the retainer box 62 are adjacent to each other in the front-rear direction).

The retainer box 62 determines a retraction limit position of the slider 3 with respect to another element row 5L so as to prevent the slider 3 from coming off from the other element row 5L. The retainer box 62 includes a retainer pin 63 adjacent in parallel to a front portion of the separable pin 61 in a state where the retainer pin 63 is connected to the separable pin 61, and a retaining box 64 in which an separable pin hole (not shown) in which a rear portion of the separable pin 61 can be inserted and removed is formed.

Similarly to the separable pin 61, the retainer pin 63 is fixed to the tape 4 and covers three surfaces including the upper surface the lower surface of the tape 4, and a side surface on a tape 4 side facing the retainer pin 63.

The retaining box 64 includes a portion fixed to the tape 4 and a portion protruding toward the facing tape 4. The retainer pin 63 extends forward from a front surface of the portion fixed to the tape 4. The separable pin hole (not shown) is formed in a front surface of the portion protruding toward the facing tape 4.

The slider 3 has a so-called automatic stop function, and includes a slider body 11 that meshes and separates the pair of element rows 5L as shown in FIG. 4; a stop claw 12 that stops at a position with respect to the pair of element rows 5L, the stop claw 12 having a claw tip 21 that is one end portion thereof, that is lowered inside the slider body 11 and that comes into contact with the elements 5; and a pull tab 13 that is connected to the stop claw 12 and the slider body 11 and that is operated when moving the slider body 11. In addition, in the present embodiment, the slider 3 includes a plate spring 14 serving as an elastic member for pushing the stop claw 12 downward, the plate spring 14 serving as a separated component from the stop claw 12; and a cover 15 covering the plate spring 14 and the stop claw 12 and serving as a connecting member for connecting the pull tab 13 and the stop claw 12 to the slider body 11, the cover 15 serving as a separated component from the slider body 11. When the pull tab 13 is pulled up, the claw tip 21 of the slider 3 is moved above the element rows 5L, making the slider body 11 movable with respect to the pair of element rows 5L, and when the pull tab 13 is released, the claw tip 21 is lowered and comes into contact with the elements 5, stopping the slider body 11 with respect to the pair of element rows 5L.

The pull tab 13 is rotatable forward and rearward. The rotation refers to a movement of operating and turning the pull tab 13 forward and rearward when opening and closing the pair of stringers 2 by the slider 3. The pull tab 13 includes a gripping portion 13*a* to be gripped when operating the pull tab 13, and a pull-tab connecting portion 13*b* extending from the gripping portion 13*a* and connected to the slider body 11. The pull-tab connecting portion 13*b* has an annular shape, and a part of the annular shape serves as a shaft portion serving as a center when the pull tab 13 is rotated.

The slider body 11 includes an upper blade 31 and a lower blade 32 that face each other with an interval therebetween in the upper-lower direction; a connecting column 33 that connects facing front portions of the upper blade 31 and the lower blade 32 to each other, and that is sandwiched between the pair of element rows 5L; and flanges 34 that protrude from left and right end portions of at least one (both in the illustrated example) of the upper blade 31 and the lower blade 32 in a direction in which a facing interval between the upper blade 31 and the lower blade 32 is reduced.

Figure 2:
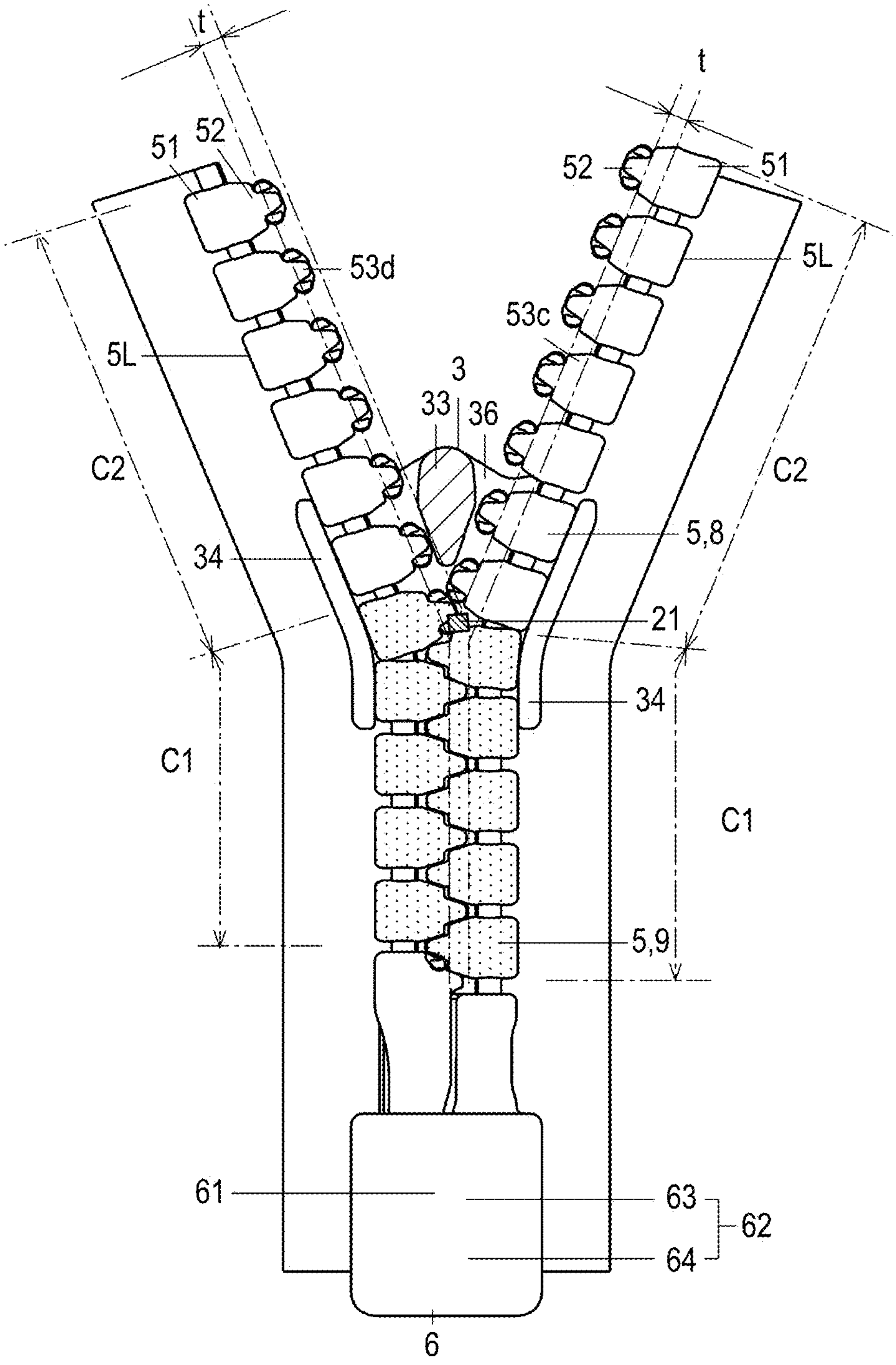
FIG. 2 is a cross-sectional view showing a relationship between a claw tip and elements inside a slider of the slide fastener of the first embodiment, as viewed from a planar direction.

As shown in FIGS. 2 and 4, the slider body 11 includes, as an internal space thereof, an element passage 36 penetrating in the front-rear direction, and tape grooves 37 in communication with the element passage 36 and opened to the left and right. The pair of element rows 5L pass through the element passage 36, and the tape 4 on a corresponding side passes through each of the tape grooves 37. Further, a front portion of the element passage 36 branches into two parts in the left-right direction with respect to the connecting column 33, and a rear portion of the element passage 36 extends in a straight line rearward with respect to the connecting column 33.

The upper blade 31 includes an upper blade main body portion 31*a* that partitions an upper side of the element passage 36, and a front column portion 31*b* and a rear column portion 31*c* that protrude from an upper surface of the upper blade main body portion 31*a* at intervals in the front-rear direction. The shaft portion of the pull tab 13, the stop claw 12, the plate spring 14, and the cover 15 are installed in this order on the upper surface of the upper blade main body portion 31*a*. A claw support recess portion 31*d* for supporting one end portion of the stop claw 12 is formed in the upper surface of the front column portion 31*b* in a recessed manner. Further, in the upper blade main body portion 31*a*, a claw hole 31*h* allowing the claw tip 21 as a tip portion of the stop claw 12 to be inserted into the element passage 36 is formed rearward with respect to the connecting column 33. The claw hole 31*h* is a through hole penetrating the upper blade 31 in the upper-lower direction.

Fitting recess portions 15*a* into which the front column portion 31*b* and the rear column portion 31*c* are fitted are formed on a lower surface of the cover 15 so as to be recessed upward. The front column portion 31*b* and the rear column portion 31*c* are fitted to lower portions of the fitting recess portion 15*a*. Spring support portions 15*b* for supporting front and rear end portions of the plate spring 14 are provided on an upper portion of an inner surface of the fitting recess portion 15*a*. Each of the spring support portions 15*b* is, for example, a recess. The plate spring 14 supported by the spring support portions 15*b* can be bent toward a bottom surface (upper surface) of the inner surface of the fitting recess portion 15*a*. In addition, in left and right side surfaces of the cover 15, shaft-passing recess portions 15*c* through which the shaft portion of the pull tab 13 passes are formed in a state of being opened downward while penetrating in the left-right direction.

The stop claw 12 includes a claw main body portion 22 extending in the front-rear direction above the shaft portion of the pull tab 13; a claw insertion portion 23 extending downward from one end portion (front end portion) of the claw main body portion 22 in the front-rear direction and inserted into the claw support recess portion 31*d*; and the claw tip 21 extending downward from another end portion (rear end portion) of the claw main body portion 22 in the front-rear direction.

The claw main body portion 22 is pressed from an upper side by the plate spring 14. Further, when the pull tab 13 is pulled up, the claw main body portion 22 is raised, the claw tip 21 is raised accordingly, the claw tip 21 is pulled up above the elements 5, and the slider 3 is movable along the pair of element rows 5L.

In the present embodiment, the claw tip 21 of the stop claw 12 stops the slider body 11 when the left and right element rows 5L enter a portion to be meshed and separated inside the slider body 11. Further, the stop claw 12 is supported above the claw tip 21 such that a position of a lower end of the claw tip 21 is constant inside the slider body 11. In the present embodiment, the claw tip 21 extends downward from a front portion with respect to a lower surface 22*a* of the other end portion of the claw main body portion 22. Accordingly, a rear portion of the other end portion of the claw main body portion 22 protrudes rearward with respect to the claw tip 21, and is supported on an upper surface of the upper blade 31 at a rear of the claw hole 31*h*.

The pair of element rows 5L have a left-right symmetrical configuration. The element row 5L includes a plurality of elements 5 fixed along each of the facing side edge portions of the pair of tapes 4. In the left-right direction as shown in (S) to (W) of FIGS. 5, the element 5 includes a fixing portion 51 that is fixed to the tape 4 in a state of sandwiching the tape 4 from both sides in the thickness direction, and a meshing portion 52 that protrudes from the fixing portion 51 to a side opposite to the tape 4 (hereinafter, referred to as "tape-opposite side") and that meshes with other elements 5. The tape 4 is omitted in FIG. 5. A side opposite to the tape-opposite side in the left-right direction is referred to as a "tape side". Further, in the upper-lower direction, the element 5 includes an upper half portion 53 which is fixed to an upper surface side of the tape 4 and extends toward the tape-opposite side, and a lower half portion 54 which is fixed to a lower surface side of the tape 4 and extends toward the tape-opposite side. The upper half portion 53 and the lower half portion 54 are integrated on a meshing portion 52 side.

In the element 5 of the first embodiment, the upper half portion 53 and the lower half portion 54 are vertically asymmetric.

The upper half portion 53 includes an upper fixing portion 53*a* fixed to the upper surface of the tape 4 and an upper meshing portion 53*b* extending from the upper fixing portion 53*a* toward the tape-opposite side.

The lower half portion 54 includes a lower fixing portion 54*a* fixed to the lower surface of the tape 4, and a lower meshing portion 54*b* extending from the lower fixing portion 54*a* toward the tape-opposite side. The upper meshing portion 53*b* and the lower meshing portion 54*b* are joined to each other and integrated on the tape-opposite side, and are vertically asymmetric.

The lower meshing portion 54*b* includes a lower neck portion 54*c* that extends from the lower fixing portion 54*a* toward the tape-opposite side and that is constricted in the front-rear direction with respect to the lower fixing portion 54*a*; and a lower head portion 54*d* that extends from the lower neck portion 54*c* toward the tape-opposite side and that bulges in the front-rear direction with respect to the lower neck portion 54*c*.

The upper meshing portion 53*b* includes an upper shoulder portion 53*c* that extends from the upper fixing portion 53*a* toward the tape-opposite side and that protrudes in the front-rear direction with respect to the lower neck portion 54*c*; and an upper head portion 53*d* that extends from the upper shoulder portion 53*c* toward the tape-opposite side and that is recessed in the front-rear direction with respect to the lower head portion 54*d*.

The upper shoulder portion 53*c* has a tapered shape in which a front-rear width is narrowed from both directions in the front-rear direction as going toward the tape-opposite side. A surface of the upper shoulder portion 53*c* facing the tape-opposite side is formed substantially parallel to the front-rear direction of the tape 4.

The upper head portion 53*d* protrudes toward the tape-opposite side from a front-rear intermediate portion of the surface of the upper shoulder portion 53*c* facing the tape-opposite side. The upper head portion 53*d* also has a tapered shape in which a front-rear width thereof is narrowed from both directions in the front-rear direction as going toward the tape-opposite side.

The fixing portion 51 includes an upper fixing portion 53*a* and a lower fixing portion 54*a*. The meshing portion 52 includes an upper meshing portion 53*b* and a lower meshing portion 54*b*. In a state where the pair of element rows 5L are meshed with each other, two elements 5 adjacent to each other in the front-rear direction are meshed with each other in a state where the upper shoulder portion 53*c* of one element 5 and the lower head portion 54*d* of another element 5 overlap with each other in the upper-lower direction, the lower neck portion 54*c* of the one element 5 and the lower head portion 54*d* of the other element 5 are adjacent to each other in the front-rear direction, and the lower head portion 54*d* of the one element 5 and the lower head portion 54*d* of the other element 5 are adjacent to each other in the left-right direction.

In the present embodiment, the element rows 5L with which the claw tip 21 of the stop claw 12 is in contact are the pair of element rows 5L as shown in FIGS. 1 and 2. When the slider 3 moves in the front-rear direction, the claw tip 21 of the stop claw 12 passes above the pair of element rows 5L. In FIG. 2, the claw tip 21 is shown as a rectangle in plan view. A trajectory along which the claw tip 21 passes above the pair of element rows 5L is defined as a claw trajectory t. The claw trajectory t is parallel to the front-rear direction, which is the direction in which the tape 4 extends. The claw trajectory t is indicated by a line in FIG. 1 for convenience. In FIG. 2, the claw trajectory t is indicated by a band having a constant width in the left-right direction. The claw trajectory t in the present embodiment is a trajectory along which the claw tip 21 passes above the meshing portion 52, more specifically, above the upper shoulder portion 53*c* (lower neck portion 54*c*) of the right element row 5L, and above the upper head portion 53*d* of the left element row 5L.

The element row 5L includes a plurality of types of elements 5, two types of elements 5 in the present embodiment. The element row 5L is classified into a plurality of classes according to a set of the elements 5. The element row 5L is classified into a neighboring class C1 which is a set of the elements 5 in a neighborhood of the opener 6 and up to an n-th element 5 from the opener 6; and a remote class C2 which is a set of the elements 5 from an (n+1)-th element 5 onwards from the opener 6. That is, n is a total number of elements in neighboring class C1. In the present embodiment, the elements 5 forming the neighboring class C1 and the elements 5 forming the remote class C2 are of different types. In order to distinguish the elements in the figure, the elements forming the neighboring class C1 are denoted by 9 in addition to the reference sign 5, and the elements forming the remote class C2 are denoted by 8 in addition to the reference sign 5, these elements are simply written as 8, 9 in the text.

The total number Z of elements 5 forming one element row 5L is n+1 or more. n is an integer of 1 or more. That is, a minimum value of n is 1.

It is desirable that a maximum value of n is equal to or less than an integer that is half the total number Z of elements 5, or equal to or less than an integer closest to the half.

For example, if the total number Z of elements 5 is an even number, the value of half the total number Z or a value of +1 of the half is three in total. Specifically, when the total number Z of elements 5 is 40, the half value is 20, and the integers closest to the half value are 19 and 21. Further, when the total number Z of elements 5 is 40, n may be any one of 19, 20, and 21 or less, and since 21 is the largest integer closest to the half, n is equal to or less than 21.

If the total number Z of elements 5 is an odd number, the value of half the total number is an integer+0.5. There are two integers closest to the half value in total. Specifically, when the total number Z of elements 5 is 41, the half value is 20.5, and the integers closest to the half value are 20 and 21. Further, when the total number Z of elements 5 is 41, n may be any one of 20 and 21 or less, and since 21 is the largest integer closest to the half, n is equal to or less than 21. In other words, the maximum value of n is a minimum integer larger than the value of half the total number of elements 5.

It is more desirable that the maximum value of n is 10 or less. In the example of FIG. 1, the total number of elements 5 forming each of the pair of element rows 5L is the same, and the total number n of elements 5 in the neighboring class C1 is 5.

Regarding an impact (slider lock strength) to be applied to the elements 5 and the stop claw 12 that collide with each other inside the slider 3 when a force for pulling out one of the element rows 5L from the slider 3 is applied to the one element row 5L, the elements 5 forming the remote class C2 include strong elements 8 of a type that strengthen the impact more than the elements 5 forming the neighboring class C1. In the present embodiment, all the elements 5 forming the remote class C2 are the strong elements 8. Meanwhile, all the elements 5 forming the neighboring class C1 are weak elements 9 of a type that weaken the impact more than the strong elements 8. The expressions "strengthen the impact" and "weaken the impact" are relative expressions. In other words, strengthening the impact means that an impact load is larger than that of a comparison object. Meanwhile, in other words, weakening the impact means that the impact load is smaller than that of the comparison object.

The weak element 9 and the strong element 8 have a difference in impact (slider lock strength) against the claw tip 21 of the stop claw 12. Factors causing the difference in the impact include a difference in hardness of a material and a difference in shape. If there is a difference in hardness, a material having a relatively hard hardness is strong against the impact, and a material having a relatively soft hardness is weak against the impact. In the present embodiment, a factor causing the difference in the impact is the difference in shape.

The lower half portions 54 of the weak element 9 and the strong element 8 have the same shape. Meanwhile, the upper half portions 53 of the weak element 9 and the strong element 8 have different shapes. Both the weak element 9 and the strong element 8 are symmetrical in the front-rear direction.

As shown in (A), (B), (S) and (T) of FIG. 5, an upper surface 90 of the weak element 9 is lower than an upper surface 80 of the strong element 8 regarding an entire region directly below the claw trajectory t on an upper surface of the element 5. A relationship between the elements 5 in the right element row 5L and the claw trajectory t will be described. More specifically, the upper surface 90 of the weak element 9 includes, in a tape-side portion thereof, a highest top surface 90*a*, and includes, in a tape-opposite-side portion thereof, a tip-facing inclined surface 91 which is lowered as going toward the tape-opposite side. Meanwhile, the upper surface 80 of the strong element 8 has the same height as that of the top surface 90*a* of the weak element 9, and is a plane orthogonal to the upper-lower direction within a range extending to both left and right sides directly below the claw trajectory t.

Further, as shown in FIG. 3, since the upper surface (tip-facing inclined surface 91) of the weak element 9 is lower than the upper surface 80 of the strong element 8 within the entire region directly below the claw trajectory t on the upper surface of the element 5, as shown in FIG. 5, regarding a corner portion between the upper surface and a front surface of the element 5, which is directly below the claw trajectory t, a surface of the corner portion of the weak element 9 is a lower corner surface 92 that is lower than a surface of the corner portion of the strong element 8.

Each of the surface (lower corner surface 92) of the corner portion of the weak element 9 and the surface of the corner portion of the strong element 8 is a curved surface that is curved in a state of bulging in a round chamfered shape and an arc shape. In the present embodiment, the surface (lower corner surface 92 (curved surface)) of the corner portion of the weak element 9 has an arc shape having the same radius as that of the surface (curved surface) of the corner portion of the strong element 8. Since the surface is curved in a state of bulging in an arc shape, a position of a center of the arc is located below the upper surface of the element 5 and behind the front surface of the element 5. Further, since the surface is curved in a state of bulging in an arc shape, the curved surface which is the surface of the corner portion of each of the strong element 8 and the weak element 9 is lowered as going toward the forward direction. Since both the weak element 9 and the strong element 8 have a symmetrical shape in the front-rear direction, regarding a corner portion between the upper surface and a rear surface of the element 5, which is directly below the claw trajectory t, a surface of the corner portion of the weak element 9 is also the lower corner surface 92 that is lower than an upper surface of the corner portion of the strong element 8.

In the slide fastener 1 of the first embodiment, since all of the elements 5 forming the neighboring class C1 are the weak elements 9 of a type that weaken the impact more than the strong elements 8, when a force for pulling out one of the element rows 5L from the slider 3 is applied to the one element row 5L in a situation in which the slider 3 is pulled down halfway in a state where the pair of element rows 5L are meshed (a situation in which the slider 3 and the opener 6 are separated), an impact (slider lock strength) to be applied to the weak elements 9 and the stop claw 12 in a situation in which the slider 3 is arranged in the neighboring class C1 is weaker than an impact to be applied to the strong elements 8 and the stop claw 12 in a situation in which the slider 3 is arranged in the remote class C2. In the slide fastener 1 according to the first embodiment, since the impact is weakened in this way, for example, as compared with a slide fastener in which all the elements 5 are the strong elements 8, the stop claw 12 easily rides over the elements 5, and the elements 5 and the stop claw 12 are unlikely to be damaged.

More specifically, in a situation in which the pair of element rows 5L are meshed with each other and the slider 3 is stopped at a position with respect to the pair of element rows 5L, a case in which the claw tip 22*a* is disposed in a non-contact state between the elements 5 adjacent to each other in the front-rear direction (a case in which the claw main body portion 22 is supported on the upper surface of the upper blade 31 in front of the claw hole 31*h*) is assumed as a reference state. In the reference state, the pulling out force is not applied to both element rows 5L. In a case of the reference state, a height of a lowermost end of the claw tip 21 is the same at any position of the pair of element rows 5L. When the pulling out force is applied to one of the element rows 5L, the slider 3 slightly moves toward the opener 6, and the claw tip 21 collides with the front surface of the element 5. As shown in (A) of FIG. 3, in a situation in which the slider 3 is disposed in the neighboring class C1 when the claw tip 21 collides with the front surface of the element 5, a position on the upper surface (the tip-facing inclined surface 91) of the weak element 9 with respect to a position of a lower end of the claw tip 21 is lower than a position on the upper surface 80 of the strong element 8, as shown in (B) of FIG. 3, in the entire region directly below the claw trajectory t, and thus the claw tip 21 rides over the upper surface of the weak element 9 more easily than over the strong element 8. The impact to be applied to the weak elements 9 and the stop claw 12 is weaker than the impact to be applied to the strong elements 8 and the stop claw 12.

In addition, since the slide fastener 1 of the first embodiment includes the weak elements 9 of the neighboring class C1 in the pair of element rows 5L, the impact to be applied to the weak elements 9 and the stop claw 12 is weaker than the impact to be applied to the strong elements 8 and the stop claw 12 when the claw tip 21 rides over the upper surfaces of the weak elements 9 in both the element rows 5L. In particular, since the claw tip 21 is disposed to be biased to one side in the left-right direction with respect to the connecting column 33, a height with respect to the lower end of the claw tip 21 is lower on the tip-facing inclined surface 91 of the weak element 9 on an opposite side with respect to the tip-facing inclined surface 91 of the weak element 9 on the biased side, and the claw tip 21 rides over the weak element 9 on the opposite side more easily than over the weak element 9 on the biased side.

In the slide fastener 1 of the first embodiment, the total number n of elements 5 in the neighboring class C1 is 5, in other words, the total number n is half or less of the total number Z of elements 5 forming the element row 5L, and n is 10 or less. Then, when a user moves the slider 3 to be positioned in the neighboring class C1 and then separates the slider 3 from the opener 6, the pulling out force may be applied to one of the element rows 5L, and thus in such a case, the claw tip 21 rides over the upper surface of the weak element 9 more easily than over that of the strong element 8.

In the element 5 applied to a slide fastener of a second embodiment of the present invention, as shown in (S) to (W) of FIG. 6, the shape of the strong element 8 is the same as that of the strong element 8 of the first embodiment, and as shown in (A) to (E) of FIG. 6, a shape of a weak element 9*a* is slightly different from that of the weak element 9 of the first embodiment.

The upper surface 90 of the weak element 9*a* is lower than the upper surface 80 of the strong element 8 regarding a front portion and a rear portion excluding an intermediate portion in an entire region directly below the claw trajectory t on the upper surface of the element 5, and is formed at the same height as the upper surface 80 of the strong element 8 regarding the intermediate portion in the front-rear direction in the entire region. Accordingly, in the weak element 9*a* of the second embodiment, regarding a corner portion between an upper surface and a front surface of the element 5, which is directly below the claw trajectory t, an upper surface of the corner portion of the weak element 9*a* is also a lower corner surface 92*a* that is lower than an upper surface of the corner portion of the strong element 8. Since both the weak element 9*a* and the strong element 8 have a symmetrical shape in the front-rear direction, regarding a corner portion between the upper surface and a rear surface of the element 5, which is directly below the claw trajectory t, a surface of the corner portion of the weak element 9*a* is also the lower corner surface 92*a* that is lower than an upper surface of the corner portion of the strong element 8.

More specifically, the upper surface 90 of the weak element 9*a* is configured such that an intermediate portion in the front-rear direction is a top surface 90*b*, a front portion with respect to the intermediate portion is a forward inclined surface 93 that is lowered as going toward the forward direction, and a rear portion with respect to the intermediate portion is a rearward inclined surface 94 that is lowered as going toward the rearward direction. Meanwhile, the upper surface 80 of the strong element 8 is a plane orthogonal to the upper-lower direction over an entire region in the front-rear direction. In addition, an upper surface (lower corner surface 92*a*) of the corner portion between the upper surface 90 and the front surface of the weak element 9*a* has an arc shape having a larger radius than an upper surface (curved surface) of the corner portion of the strong element 8.

In the slide fastener of the second embodiment, when the pulling out force is applied to one of the element rows 5L, since the front portion of the upper surface 90 of the weak element 9*a* is the forward inclined surface 93, the claw tip 21 rides over the upper surface of the weak element 9*a* more easily than over that of the strong element 8 as compared with the strong element 8, and an impact (slider lock strength) to be applied to the weak elements 9*a* and the stop claw 12 is weaker than an impact to be applied to the strong elements 8 and the stop claw 12.

An element 5*b* applied to a slide fastener of a third embodiment of the present invention is different in shape from the element 5 of the first embodiment as shown in FIG. 7.

The element 5*b* is the same as the element 5 of the first embodiment in that the element 5*b* includes the fixing portion 51 and the meshing portion 52 in the left-right direction. However, the element 5*b* is clearly different from the element 5 of the first embodiment in that the upper half portion 55 and the lower half portion 56 have a symmetrical shape in the upper-lower direction.

The meshing portion 52 includes a neck portion 52*a* that extends from the fixing portion 51 toward the tape-opposite side and that is constricted in the front-rear direction with respect to the fixing portion 51; a head portion 52*b* that extends from the neck portion 52*a* toward the tape-opposite side and that bulges in the front-rear direction with respect to the neck portion 52*a*; and a pair of shoulder portions 52*c* that protrude in the front-rear direction from a fixing portion 51 side of the neck portion 52*a*, and the pair of shoulder portions 52*c* are meshed with recessed groove portions 52*d* formed in the head portions 52*b* of other elements 5*b*. The recessed groove portion 52*d* is opened toward the tape-opposite side at a height intermediate portion in the upper-lower direction of the head portion 52*b*, and penetrates in the front-rear direction.

The claw trajectory t in the present embodiment is a trajectory in which the claw tip 21 passes above the pair of shoulder portions 52*c* in the element row 5L on one side (right side in FIG. 7) and passes above the head portion 52*b* in the element row 5L on another side (left side in FIG. 7). Hereinafter, as shown in FIG. 7, a relationship between the element 5*b* of the right element row 5L and the claw trajectory t will be described.

The upper surface 90 of the weak element 9*b* includes a boundary inclined surface 96 that is lowered as going toward the tape-opposite side at a boundary portion between the fixing portion 51 and the meshing portion 52. Further, the upper surface of the weak element 9*b* is configured such that a portion on the tape side with respect to the boundary inclined surface is a top surface 90*c* which is an upper surface of the fixing portion 51, and a portion on the tape-opposite side with respect to the boundary inclined surface 96 is a lower step surface 95 which is lower than the top surface 90*c* of the fixing portion in a stepped manner and which has a planar shape orthogonal to the upper-lower direction. That is, the upper surface 90 of the weak element 9*b* includes the top surface 90*c* which is the upper surface of the fixing portion 51, the lower step surface 95 which is lowered in a stepped manner, and the boundary inclined surface 96. The boundary inclined surface 96 and a part (tape-side portion) of the lower step surface 95 are arranged in an entire region directly below the claw trajectory t on the upper surface of the element 5*b*.

Meanwhile, the upper surface 80 of the strong element 8 at the fixing portion 51 and the meshing portion 52 are formed at the same height as the upper surface (top surface 90*c*) of the fixing portion 51 of the weak element 9*b*. Therefore, the upper surface 90 of the weak element 9 is lower than the upper surface 80 of the strong element 8 in the entire region directly below the claw trajectory t on the upper surface of the element 5*b*.

Since the upper surface 90 (boundary inclined surface 96 and a part of the lower step surface 95) of the weak element 9*b* is lower than the upper surface 80 of a strong element 8*b* in the entire region directly below the claw trajectory t on the upper surface of the element 5*b*, regarding a corner portion between the upper surface and a front surface of the element 5*b*, which is directly below the claw trajectory t, a surface of the corner portion of the weak element 9*b* is a lower corner surface 92*b* which is lower than a surface of the corner portion of the strong element 8*b*.

Each of the surface (lower corner surface 92*b*) of the corner portion of the weak element 9*b* and the surface of the corner portion of the strong element 8*b* is a curved surface that is curved in a state of bulging in an arc shape. In the present embodiment, the surface (lower corner surface 92*b*) of the corner portion of the weak element 9*b* has an arc shape having the same radius as that of the surface (curved surface) of the corner portion of the strong element 8*b*. Further, since being curved in a state of bulging in an arc shape, the curved surface which is the surface of the corner portion of each of the weak element 9*b* and the strong element 8*b* is lowered as going toward the forward direction.

Since both the weak element 9*b* and the strong element 8*b* have a symmetrical shape in the front-rear direction, regarding a corner portion between the upper surface and a rear surface of the element 5*b*, which is directly below the claw trajectory t, a surface of the corner portion of the weak element 9*b* is the lower corner surface 92*b* that is lower than an upper surface of the corner portion of the strong element 8*b*.

In the slide fastener of the third embodiment, when the pulling out force is applied to one of the element rows 5L, since a position of the upper surface 90 (boundary inclined surface 96) of the weak element 9*b* is lower than a position of the upper surface 80 of the strong element 8*b* in the entire region directly below the claw trajectory t, the claw tip 21 rides over the upper surface of the weak element 9*b* more easily than over that of the strong element 8*b*.

In the element 5*b* applied to a slide fastener of a fourth embodiment of the present invention, as shown in (S) to (V) of FIG. 8, the shape of the strong element 8*b* is the same as that of the strong element 8*b* of the third embodiment, and as shown in (A) to (D) of FIG. 8, a shape of a weak element 9*c* is slightly different from that of the weak element 9*b* of the third embodiment. A relationship between the elements 5*b* in the right element row 5L and the claw trajectory t will be described.

The upper surface 90 of the weak element 9*c* is lower than the upper surface 80 of the strong element 8*b* regarding a front portion and a rear portion excluding an intermediate portion in an entire region directly below the claw trajectory t on the upper surface of the element 5*b*, and is formed at the same height regarding the intermediate portion in the front-rear direction in the entire region. Accordingly, in the weak element 9*c* of the fourth embodiment, regarding a corner portion between an upper surface and a front surface of the element 5*b*, which is directly below the claw trajectory t, a surface of the corner portion of the weak element 9*c* is also a lower corner surface 92*c* that is lower than an upper surface of the corner portion of the strong element 8*b*. Accordingly, regarding a corner portion between the upper surface and a rear surface of the element 5*b*, which is directly below the claw trajectory t, a surface of the corner portion of the weak element 9*c* is also the lower corner surface 92*c* that is lower than a surface of the corner portion of the strong element 8*b*.

Each of the surface (lower corner surface 92*c*) of the corner portion of the weak element 9*c* and the surface of the corner portion of the strong element 8*b* is a curved surface that is curved in a state of bulging in an arc shape. An upper surface (lower corner surface 92*c*) of the corner portion of the weak element 9*c* has an arc shape having a radius larger than that of the upper surface (curved surface) of the corner portion of the strong element 8*b*.

More specifically, the upper surface 90 of the weak element 9*c* includes, at an intermediate portion thereof in the front-rear direction, a top surface 90*d*, a front portion with respect to the intermediate portion is a forward inclined surface 97 that is lowered as going toward the forward direction, and a rear portion with respect to the intermediate portion is a rearward inclined surface 98 that is lowered as going toward the rearward direction. Meanwhile, the upper surface 80 of the strong element 8*b* is a plane orthogonal to the upper-lower direction in the entire region in the front-rear direction (excluding the corner portion between the upper surface and the front surface and the corner portion between the upper surface and the rear surface), and has the same height as the top surface 90*d* of the weak element 9*c*.

In the slide fastener 1 of the fourth embodiment, when the pulling out force is applied to one of the element rows 5L, since the front portion of the upper surface 90 of the weak element 9*c* is the forward inclined surface 97, the claw tip 21 rides over the upper surface of the weak element 9*c* more easily than over that of the strong element 8*b*, and an impact (slider lock strength) to be applied to the weak elements 9*c* and the stop claw 12 is weaker than an impact to be applied to the strong elements 8*b* and the stop claw 12.

As shown in FIG. 9, a slide fastener 1*a* of a fifth embodiment of the present invention is different from the slide fastener 1 of the first embodiment in that the slide fastener 1*a* includes two sliders 3, 3*a* and in a configuration of an opener 6*a*. The configurations of the neighboring class C1 and the remote class C2 are the same as those of the slide fastener of the first embodiment.

One of the two sliders 3, 3*a* is the first slider 3 that closes the pair of element rows 5L by moving in the forward direction, and another is the second slider 3*a* that closes the pair of element rows 5L by moving in the rearward direction. The first slider 3 has the same configuration as the slider 3 of the first embodiment. The second slider 3*a* is symmetrical to the first slider 3 in the front-rear direction, except that the stop claw 12 is not provided.

The opener 6*a* includes a pair of opener pieces 61*a*, 62*a* that are separately fixed to rear end portions of the pair of tapes 4 in the front-rear direction in a state of being adjacent to the element rows 5L on a rear side. In the present embodiment, one opener piece 61*a* is an separable pin 61*a* fixed to the facing side edge portion of one of the tapes 4, and another opener piece 62*a* is a retainer pin 62*a* fixed to the facing side edge portion of another of the tapes 4. When being positioned at a rear end portion of the retainer pin 62*a*, the second slider 3*a* exhibits the same function as the retainer box of the first embodiment. Further, when the second slider 3*a* and the first slider 3 are arranged at a rear end portion of one element row 5L in a state of being adjacent to each other in the front-rear direction, a rear end portion of the other element row 5L can be inserted into and removed from one side in the left-right direction of the element passages 36 of the first slider 3 and the second slider 3*a*.

The slide fastener 1*a* of the fifth embodiment has the same effect as the slide fastener 1 of the first embodiment.

A method of manufacturing the slide fastener 1 of the first embodiment described above is performed in order of steps (1) to (9) as shown in FIG. 10.

(1) Tape preparation step. The tape preparation step is a step of preparing the pair of tapes 4. In order to mass-produce a plurality of the slide fasteners 1, a long tape is used as the tape 4.

(2) First injection molding step. In the first injection molding step, the strong elements 8 are injection-molded on the pair of tapes 4 facing each other in the left-right direction. The first injection molding step is a step of forming gate portions G in parallel between the pair of tapes 4 and forming the strong elements 8 in a state where the strong elements 8 are spaced apart in the front-rear direction on the left and right of the gate portions G and the gate portions G and the tapes 4 are connected.

(3) Gate portion removing step. The gate portion removing step is a step in which the gate portions G are removed to leave the strong elements 8 separately fixed to the pair of tapes 4.

(4) Meshing step. The meshing step is a step of meshing the pair of tapes 4 with each other using the strong elements 8.

(5) Strong element removing step and tape reinforcing step. The strong element removing step is a step of removing a part of the strong elements 8 among the plurality of meshed strong elements 8 from a part of the tapes 4 to form removed portions 4*b* on the pair of tapes 4. The tape reinforcing step is a step of attaching a reinforcing tape 4*a* to the tape 4 in a region including an intermediate portion in the front-rear direction of each of the removed portions 4*b* and left and right peripheries thereof, and then partially punching the tape 4 together with the reinforcing tape 4*a*.

(6) Second injection molding step. The second injection molding step is a step of injection molding the pair of opener pieces 61, 62 and the weak elements 9 on the pair of tapes 4 in a region including the removed portions. More specifically, in the second injection molding step, the opener pieces 61, 62 may be injection-molded after the weak elements 9 are injection-molded, or the weak elements and the opener pieces 61, 62 may be injection-molded at the same time. The element rows 5L are completed by the second injection molding step. In the figure, the weak elements 9 are meshed, and the opener 6 is in a state where the separable pin 61 is inserted into the retainer box 62, but in practice, after the second injection molding step, the separable pin 61 is inserted into a hole of the retainer box 62, and the meshing step of meshing the pair of element rows 5L together is performed again.

(7) Cutting step. The cutting step is a step of cutting the pair of tapes 4 to a predetermined length required for one slide fastener 1.

(8) Slider insertion step. The slider insertion step is a step of inserting the slider 3 into the pair of element rows 5L from a side opposite to the opener 6. When the slider 3 is inserted, portions of the pair of element rows 5L through which the slider 3 passes are separated in the left-right direction.

(9) Third injection molding step. The third injection molding step is a step of separately injection molding the stoppers 7 on the tapes 4 on a side opposite to the opener 6 with respect to the element rows 5L. Thus, the slide fastener 1 of the first embodiment is completed. In the present embodiment, the injection-molding means that the element 5, the opener 6, and the stopper 7 are made of plastic.

The method of manufacturing the slide fastener 1 of the first embodiment is a method of efficiently manufacturing a plurality of slide fasteners 1. Further, since a pair of stringers 2 are manufactured by manufacturing the slide fastener 1, a method of manufacturing the stringer 2 is also described by describing the method of manufacturing the slide fastener 1. Further, the method of manufacturing the slide fastener 1 is not limited to the method of manufacturing the slide fastener 1 of the first embodiment, and for example, the pair of stringers 2 may be separately manufactured, and then the slider 3 may be inserted into the pair of element rows 5L.

The present invention is not limited to the above-described embodiments, and can be appropriately changed without departing from the gist of the present invention.

For example, in order to stop the slider body 11, in the present embodiment, the claw tip 21 of the stop claw 12 enters between the meshing portions 52 adjacent to each other in the front-rear direction in the left and right element rows 5L inside the slider body 11, but the present invention is not limited thereto, and the claw tip 21 may enter between the fixing portions 51 adjacent to each other in the front-rear direction in one of the element rows 5L.

In addition, each of the element rows 5L includes two types of elements in the above-described embodiments, but the present invention is not limited thereto, and three or more types of elements may be used.

REFERENCE SIGNS LIST

1, 1*a*: slide fastener
2: stringer
3, 3*a*: slider
11: slider body
12: stop claw
13: pull tab
13*a*: gripping portion
13*b*: pull-tab connecting portion
14: plate spring
15: cover
15*a*: fitting recess portion
15*b*: spring support portion
15*c*: shaft-passing recess portion
21: claw tip
22: claw main body portion
22*a*: lower surface
23: claw insertion portion
t: claw trajectory
31: upper blade
31*a*: upper blade main body portion
31*b*: front column portion
31*c*: rear column portion
31*d*: claw support recess portion
31*h*: claw hole
32: lower blade
33: connecting column
34: flange
36: element passage
37: tape groove
4: tape
4*a*: reinforcing tape
4*b*: removed portion
5, 5*b*: element
51: fixing portion
52: meshing portion
52*a*: neck portion
52*b*: head portion
52*c*: shoulder portion
52*d*: recessed groove portion
53: upper half portion
53*a*: upper fixing portion
53*b*: upper meshing portion
53*c*: upper shoulder portion
53*d*: upper head portion
54: lower half portion
54*a*: lower fixing portion
54*b*: lower meshing portion
54*c*: lower neck portion
54*d*: lower head portion
55: upper half portion
56: lower half portion
5L: element row
6, 6*a*: opener
61, 61*a*: opener piece (separable pin)
62, 62*a*: opener piece (retainer box, retainer pin)
63: retainer pin
64: retaining box
7: stopper
8, 8*b*: strong element
80: upper surface
9, 9*a*, 9*b*, 9*c*: weak element
90: upper surface
90*a*, 90*b*, 90*c*, 90*d*: top surface
91: tip-facing inclined surface
93, 97: forward inclined surface
94, 98: rearward inclined surface
95: lower step surface
96: boundary inclined surface
92, 92*a*, 92*b*, 92*c*: lower corner surface
C1: neighboring class
C2: remote class
G: gate portion
n: total number of elements in neighboring class
Z: total number of elements

The invention claimed is:

1. A slide fastener, comprising:

a pair of stringers; and a slider configured to open and close the pair of stringers and configured to stop at a position with respect to the pair of stringers, wherein the pair of stringers include:

a pair of tapes extending in a front-rear direction and facing each other in a left-right direction, a pair of element rows each including a plurality of elements fixed along a corresponding one of facing side edge portions of the pair of tapes, an opener including a pair of opener pieces separately fixed to end portions of the pair of tapes in the front-rear direction, the opener allowing one of the pair of opener pieces to be inserted into and removed from the slider together with one of the pair of element rows, and a pair of stoppers separately fixed to front end portions of the pair of tapes opposite to the end portions of the pair of tapes, the slider includes a slider body that is configured to mesh and separate the pair of element rows and a stop claw that is configured to stop at a position with respect to the pair of element rows, and a claw tip that is one end portion of the stop claw is configured to be lowered inside the slider body and configured to come into contact with one of the plurality of elements, at least one element row among the pair of element rows with which the claw tip is to come into contact includes at least one weak element located adjacent to one of the pair of opener pieces for the at least one element row and strong elements located between the at least one weak element and the stopper for the at least one element row, the at least one weak element is different from the strong elements in hardness of material or shape, and the plurality of elements of the pair of element rows adjacent to the opener include the at least one weak element and at least one other weak element on a respective facing side edge portion of the pair of tapes.

2. The slide fastener according to claim 1, wherein the at least one weak element includes a plurality of weak elements and a number of the plurality of weak elements is equal to or less than half a total number of the plurality of elements forming the at least one element row.

3. The slide fastener according to claim 1, wherein the at least one weak element includes a plurality of weak elements and a number of the plurality of weak elements is 10 or less.

4. The slide fastener according to claim 1, wherein in the front-rear direction, a direction in which the slider is moved away from the opener is defined as a forward direction, a trajectory in which the claw tip of the stop claw passes above the pair of element rows is defined as a claw trajectory, and regarding a corner portion between an upper surface and a front surface of each of the plurality of elements, which is directly below the claw trajectory, a surface of the corner portion of the at least one weak element is a lower corner surface that is lower than a surface of the corner portion of the strong elements.

5. The slide fastener according to claim 4, wherein the lower corner surface is lowered as going toward the forward direction.

6. The slide fastener according to claim 5, wherein the lower corner surface is a curved surface that is curved in a state of bulging in an arc shape.

7. The slide fastener according to claim 1, wherein in the front-rear direction, a direction in which the slider is moved away from the opener is defined as a forward direction, a trajectory in which the claw tip of the stop claw passes above the pair of element rows is defined as a claw trajectory, and the at least one weak element, has at a front portion of an upper surface which is directly below the claw trajectory, a forward inclined surface that is lowered as going toward the forward direction.

8. The slide fastener according to claim 1, wherein in the front-rear direction, a direction in which the slider is moved away from the opener is defined as a forward direction, a trajectory in which the claw tip of the stop claw passes above the pair of element rows is defined as a claw trajectory, and in an entire region that is directly below the claw trajectory on an upper surface of the at least one weak element, an upper surface of the at least one weak element is lower than an upper surface of the strong elements.

9. The slide fastener according to claim 8, wherein the upper surface of the at least one weak element is, in an entire region from a portion directly below the claw trajectory to a direction opposite to a corresponding one of the pair of tapes, a tip-facing inclined surface that is lowered as going toward a side opposite to the corresponding one of the pair of tapes.

10. A method for manufacturing a stringer to be used for the slide fastener according to claim 1, the method comprising:

a first injection molding step of injection-molding a set of strong elements for the at least one element row on a respective one of the pair of tapes;

a strong element removing step of removing a portion of the set of strong elements from a part of the respective one of the pair of tapes to form a removed portion; and a second injection molding step of injection-molding the opener piece for the at least one element row and the at least one weak element on the respective one of the pair of tapes in a region including the removed portion.

11. The method for manufacturing the stringer to be used for the slide fastener according to claim 10, wherein in the second injection molding step, the opener piece is injection-molded after the at least one weak element is injection-molded.

12. The method for manufacturing the stringer to be used for the slide fastener according to claim 10, wherein in the second injection molding step, the at least one weak element and the opener piece are injection-molded at the same time.

* * * * *